May 16, 1961  F. A. ALSTON  2,984,494
ADJUSTABLE MOUNTS FOR SELF-CENTERING CHUCKS
Filed Dec. 18, 1959
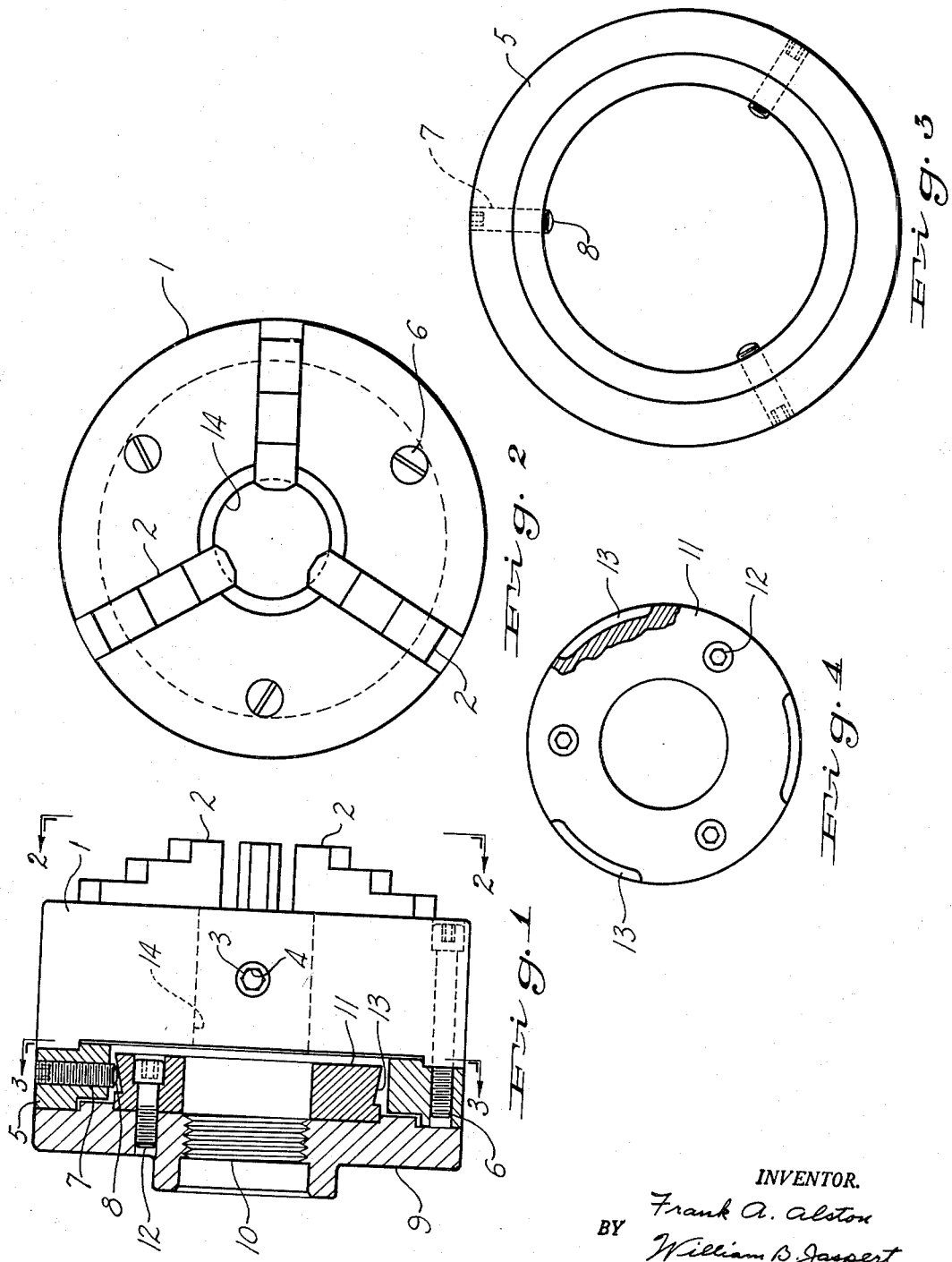
INVENTOR.
Frank A. Alston
BY William B. Jaspert

2,984,494
ADJUSTABLE MOUNTS FOR SELF-CENTERING CHUCKS

Frank A. Alston, 1121 Penn Ave., Wilkinsburg, Pa.

Filed Dec. 18, 1959, Ser. No. 860,519

1 Claim. (Cl. 279—6)

This invention relates to new and useful improvements in lathe chucks, more particularly chucks of the self-centering type in which the work piece is clamped by three jaws that are simultaneously movable, as by a scroll plate, to grip the piece, particularly rounds such as rods, tubes, rings and the like.

In chucks of this type, if for example a 1" steel rod is centered in the chuck jaws so that the circular periphery of the rod is concentric, a change in the diameter of the stock, as for example changing from 1" to 1½", would result in an eccentric mount because the grooves of the scroll plate or the threads or grooves of the chuck jaws are not accurate. Some adjustment must be made and the present invention provides for mounting the chuck on the back plate of a lathe with adjusting means to allow for centering the chuck after the work piece has been secured by the jaws of the chuck.

It is among the objects of the invention to provide a mounting means for a self-centering chuck with adjustments for the chuck to center the work piece after it has been clamped in the chuck jaws.

The invention will become more apparent from a consideration of the accompanying drawing constituting a part hereof in which like reference characters designate like parts and in which:

Figure 1 is a vertical section, partially in elevation, of a lathe back plate and chuck embodying the adjusting mechanism of this invention;

Figure 2, a front elevational view taken along the line 2—2, Figure 1;

Figure 3, an elevational view of a spacer plate taken along the line 3—3, Figure 1; and Figure 4, a front elevational view of a cam plate, partially broken away to show a groove.

In the drawing, the numeral 1 designates a chuck body having chuck jaws 2 of which there are three for centering and clamping the work piece, which may be either a round rod, tubing or rings and the like, the chuck body 1 houses a scroll plate having spacer threads that engage or interact with the threads or grooves on the bottom of the chuck jaws 2. The scroll plate is rotatable by a screw shaft 3 having a socket 4 for a wrench by which the jaws are extended or contracted to release and clamp the piece to be worked on in the lathe.

In accordance with the present invention, the chuck body 1 is mounted on a spacer plate 5 by bolts 6 that extend through the chuck body. The spacer plate 5 is provided with adjusting screws 7 having rounded ends 8, as shown in Figures 1 and 3.

The lathe on which the chuck is mounted has a back plate 9 having a threaded portion 10, or other construction, that fits on the threaded end of a lathe spindle, not shown. Secured to the back plate is a cam plate 11 that is fastened to the back plate by screw bolts 12, of which there are 3 or more, as shown in Figure 4. The cam plate 11 is provided with a plurality of dovetail shaped undercut portions 13, Figure 1, which are engaged by the rounded end 8 of the adjusting screws 7 in the manner shown in Figure 1 to drive the chuck. The cam plate 11 has the dual function of readily adjusting the chuck body 1 and at the same time drawing the body 1 in the direction of the back plate 9 by virtue of the tapered face of the dovetail grooves 13. The rounded end 8 of the adjusting screws 7 allows the face or end of the screw 8 to grip, as it were, on the dovetail face 13 for the axial adjustment while at the same time providing clearance for radial movement of the chuck body.

The stock to be worked on is inserted through the opening 14 of the chuck and the jaws 2 are then closed by rotating the screw element 3 with the wrench fitted in the socket 4, Figure 1.

When the jaws grippingly engage the work piece, the chuck is subjected to rotation and the piece is tested for concentricity. If it is off-center, the screws 7 are adjusted until the work piece is concentric and revolves on a true center. Because of the inclination of the face 13, the chuck body and spacer plate 5 is solidly held against the back plate 9, sufficient clearance being provided between the cam plate 11 and the chuck body 1 to draw the latter in the direction of the back plate 9. The screws 7 drive the chuck even though they may loosely engage the dovetail shaped grooves 13.

It will be seen from the foregoing description of the invention that my improved chuck allows for speedy adjustment and centering of the work piece and that the adjusting mechanism and mounting consisting of the spacer plate, cam plate and adjusting screws adapts the invention for use by standard chucks without entailing the expense of buying new chucks having built-in adjusting means such as are now available on the market. Such chuck replacements are costly and the spacer and cam plates can be mounted on any chuck and back plate of a lathe.

Although one embodiment of the invention has been herein shown and described, it will be evident to those skilled in the art that various modifications may be made in the details of construction without departing from the principles herein set forth.

I claim:

An adjustable mount for self-centering chucks comprising a spacer plate adapted for attachment to the back of the chuck body and a cam plate adapted for attachment to the back plate of a lathe, adjusting screws in said spacer plate and angularly spaced inclined grooves in said cam plate for engagement by the end of the adjusting screws whereby the chuck body is radially adjusted to center the work piece engaged by the jaws of the chuck and is moved axially in the direction of the back plate when the screws are turned for radial adjustment.

References Cited in the file of this patent

UNITED STATES PATENTS

| 2,785,902 | Zajdel | Mar. 19, 1957 |
| 2,898,120 | Goepfrich | Aug. 4, 1959 |

FOREIGN PATENTS

| 869,587 | Germany | Mar. 5, 1953 |